United States Patent
Zhang

(10) Patent No.: US 12,511,715 B2
(45) Date of Patent: Dec. 30, 2025

(54) LESION DETECTION METHOD

(71) Applicant: KONINKLIJKE PHILIPS N.V., Eindhoven (NL)

(72) Inventor: Yajing Zhang, Suzhou (CN)

(73) Assignee: KONINKLIJKE PHILIPS N.V., Eindhoven (NL)

(*) Notice: Subject to any disclaimer, the term of this patent is extended or adjusted under 35 U.S.C. 154(b) by 553 days.

(21) Appl. No.: 17/919,557

(22) PCT Filed: Apr. 20, 2021

(86) PCT No.: PCT/EP2021/060216
§ 371 (c)(1),
(2) Date: Oct. 18, 2022

(87) PCT Pub. No.: WO2021/214042
PCT Pub. Date: Oct. 28, 2021

(65) Prior Publication Data
US 2023/0162339 A1 May 25, 2023

(30) Foreign Application Priority Data

Apr. 23, 2020 (WO) ............... PCT/CN2020/086259
May 14, 2020 (EP) ................................... 20174654

(51) Int. Cl.
*G06T 5/50* (2006.01)
*A61B 5/00* (2006.01)
*G06T 7/00* (2017.01)

(52) U.S. Cl.
CPC ............. *G06T 5/50* (2013.01); *A61B 5/4076* (2013.01); *G06T 7/0012* (2013.01);
(Continued)

(58) Field of Classification Search
CPC ................. G06T 5/50; G06T 7/0012; G06T 2207/10081; G06T 2207/10084;
(Continued)

(56) References Cited

U.S. PATENT DOCUMENTS 4,551,800 A  11/1985  Riederer et al.
6,909,792 B1  6/2005  Carrott et al.
(Continued)

FOREIGN PATENT DOCUMENTS

JP  2004041694 A  2/2004
JP  2011015848 A  1/2011
(Continued)

OTHER PUBLICATIONS

Kimura et al., "SISCOM technique with a variable Z score improves detectability of focal cortical dysplasia: a comparative study with MRI Annals of Nuclear Medicine", vol. 26 Issue 5, pp. 397-404, 2012.
(Continued)

*Primary Examiner* — Jamares Q Washington

(57) ABSTRACT

The present invention relates to lesion detection. In order to improve lesion detection, it is proposed to combine the techniques of deep learning and the strategy of silhouette, i.e. subtraction between contrast-enhanced and non-contrast-enhanced, in order to reflect only the difference between the two images related to the lesion.

20 Claims, 3 Drawing Sheets

(52) U.S. Cl.
CPC ............... *G06T 2207/10081* (2013.01); *G06T 2207/10084* (2013.01); *G06T 2207/10088* (2013.01); *G06T 2207/10104* (2013.01); *G06T 2207/20081* (2013.01); *G06T 2207/20084* (2013.01); *G06T 2207/20224* (2013.01); *G06T 2207/30096* (2013.01)

(58) Field of Classification Search
CPC . G06T 2207/10088; G06T 2207/10104; G06T 2207/20081; G06T 2207/20224; G06T 2207/30096
USPC ........ 382/128, 130, 131, 132, 156, 254, 260
See application file for complete search history.

(56) References Cited

U.S. PATENT DOCUMENTS

| | | | | |
|---|---|---|---|---|
| 8,472,684 | B1* | 6/2013 | Periaswamy | A61B 6/5235 382/128 |
| 2017/0065241 | A1 | 3/2017 | Hoernig | |
| 2017/0372497 | A1 | 12/2017 | Hu et al. | |
| 2018/0330525 | A1* | 11/2018 | Zhao | G16H 30/40 |
| 2019/0056470 | A1 | 2/2019 | Wang | |
| 2019/0108634 | A1 | 4/2019 | Zaharchuk | |
| 2019/0122348 | A1 | 4/2019 | Jensen | |
| 2020/0058098 | A1 | 2/2020 | Hirakawa | |
| 2022/0254023 | A1* | 8/2022 | McKinney | G16H 30/40 |
| 2022/0334208 | A1* | 10/2022 | Tamir | G06T 5/50 |

FOREIGN PATENT DOCUMENTS

| | | |
|---|---|---|
| JP | 2018192264 A | 12/2018 |
| WO | 2011109872 A1 | 9/2011 |

OTHER PUBLICATIONS

Kiarashi Nooshin et al. "Development and Application of a Suite of 4-D Virtual Breast Phantoms for Optimization and Evaluation of Breast Imaging Systems". IEEE Transactions on Medical Imaging, IEEE Service Center, Piscataway, NJ, US. vol. 33, No. 7, Jul. 1, 2014 (Jul. 1, 2014), pp. 1401-1409, XP011552355, ISSN: 0278-0063, DOI: 10.1109/TMI.2014.2312733 [retrieved on Jun. 27, 2014].

Roy Snehashis et al., "Magnetic Resonance Image Example-Based Contrast Synthesis". IEEE Transactions on Medical Imaging, IEEE Service Center Piscataway, NJ, US., vol. 32 No. 12 Dec. 1, 2013 (Dec. 1, 2013), pp. 2348-2363, XP011531942, [ISSN: 0278-0062, DOI: 10.1109/TMI.2013.2282126 [retrieved on Nov. 25, 2013].

Kenneth Lau et al. "A Unified Representation Network for Segmentation with Missing Modalities", arxiv.org, Cornell University Library, 201 Olin Library Cornell University Ithaca, NY 14853, Aug. 19, 2019 (Aug. 19, 2019), XP081465125.

Yu Butubg et al. "Sample-Adaptive GANs: Linking global and Local Mappings for Cross-Modality MR Image Synthesis", IEEE Transactions on Medical Imaging, IEEE Service Center Piscataway, NJ, US.vol. 39, No. 7, Jan. 27, 2020 (Jan. 27, 2020), pp. 2339-2350, XP011796108, ISSN: 0278-0062, DOI: 10.1109/TMI.2020.2969630 [retrieved on Jun. 30, 2020] p. 2239, right-hand column, paragraph 1.

Pinto Adriano et al. "Brain Tumour Segmentation based on Extremely Randomized Forest with high-level features", 2015 37th Annyal International Conference of the IEEE Engineering in Medicine and Biology Society (EMBC), ieee, Aug. 25, 2015 (Aug. 25, 2015), pp. 3037-3040, XP032810809, DOI: 10.1109/EMBC.2015.7319032 p. 3038, right-hand column, lines 2-14.

International search report for application No. PCT/EP2021/060216 dated Jul. 14, 2021.

* cited by examiner

LESION DETECTION METHOD

CROSS-REFERENCE TO PRIOR APPLICATIONS

This application is the U.S. National Phase application under 35 U.S.C. § 371 of International Application No. PCT/EP2021/060216 filed on Apr. 20, 2021, which claims the benefit of International Application No. PCT/CN2020/086259 filed on Apr. 23, 2020 and European Application No. 20174654.2 filed May 14, 2020. These applications are hereby incorporated by reference herein.

FIELD OF THE INVENTION

The present invention relates to lesion detection, and in particular, to an apparatus and a computer-implemented method for lesion detection, as well as a computer program element and a computer readable medium.

BACKGROUND OF THE INVENTION

The detection of lesion at the early stage of disease is crucial for effective treatment. The diagnostic imaging methods, such as magnetic resonance (MR), computed tomography (CT), digital X-ray (DXR), etc., are effective to reflect the lesions by a change of image contrast compared to normal tissue responses. For example, multiple sclerosis (MS) is a disease with brain white matter demyelination in the central nervous system, and the white matter lesion has different contrast on MR images. With the hyper-intensity of image contrast at white matter lesions, it is feasible to segment the lesion and perform analysis.

However, the image contrast is not always distinguishable directly, due to poor signal-to-noise ratio (SNR) or imaging parameters. Very small lesions may be missed by human eyes when the radiologist becomes tired after intensive image readings. Some contrast enhanced methods could be used, e.g. contrast agent in magnetic resonance imaging (MRI). The use of contrast agent is limited to those who are allergic to the chemicals.

Artificial intelligence (AI) and deep learning have been rapidly developed and has been able to detect the hyper-intensity-based lesions automatically when the image quality is satisfied. The detection accuracy decreased when image contrast is degraded.

SUMMARY OF THE INVENTION

There may be a need to improve lesion detection.

The object of the present invention is solved by the subject-matter of the independent claims, wherein further embodiments are incorporated in the dependent claims. It should be noted that the following described aspects of the invention apply also for the apparatus, the computer-implemented method, the computer program element and the computer readable medium.

According to a first aspect of the present invention, there is provided an apparatus for lesion detection. The apparatus comprises an input channel configured for receiving a first input medical image of a region of interest obtained using a first imaging modality and a second input medical image of the region of interest obtained using a second imaging modality, wherein the second imaging modality has a higher sensitivity for detecting a lesion than the first imaging modality. The apparatus also comprises a synthesis module configured for applying a pre-trained deep learning neural network to the first input medical image obtained using the first imaging modality to derive a second synthesized medical image. The pre-trained deep learning network has been trained based on a training dataset comprising historical datasets of medical images of the region of interest obtained using the first imaging modality and medical images of the region of interest obtained using the second imaging modality. The apparatus further comprises a silhouette module configured for co-registering the second input medical image and the second synthesized medical image, and performing a subtraction between the second input medical image and the second synthesized medical image to obtain a subtraction image, which is usable for lesion detection.

In other words, it is proposed to combine the technique of deep learning and the strategy of silhouette, i.e. subtraction between contrast-enhanced and non-contrast-enhanced, in order to reflect only the difference between the two images related to the lesion. For the lesion sensitive to the second imaging modality, also denoted with modality B, while not sensitive to the first imaging modality, also denoted with modality A, deep learning is applied to generate a synthesized image of modality B (ImgB_syn) from a large population dataset. Then, the silhouette between the actual image of modality B (ImgB) and the synthesized image of modality B ($\|ImgB\_syn - ImgB\|$) is performed. The difference reflects the sensitive response of lesion region in modality B. This will be explained hereafter and in particular with respect to the embodiments illustrated in FIGS. 1 to 4.

This subtraction image emphasizes on the lesion region without the need for contrast agent injection. The obvious lesion region in the subtraction image may achieve higher contrast-to-noise ratio (CNR), and may be helpful for quick diagnosis with more confidence.

According to an embodiment of the present invention, the silhouette module is configured for normalizing the second input medical image and the second synthesized medical image, and performing a subtraction between the normalized second input medical image and the normalized second synthesized medical image.

According to an embodiment of the present invention, the apparatus further comprises a lesion identification module configured for identifying the lesion in the subtraction image.

For example, methods like classifier, region growing, neural networks, and deformable models may be used for automated lesion detection.

According to an embodiment of the present invention, the pre-trained deep learning neural network comprises at least one of: U-Net, and generative adversarial networks.

According to an embodiment of the present invention, the lesion comprises a multiple sclerosis disease lesion.

According to an embodiment of the present invention, the first imaging modality and the second imaging modality comprise at least one of the following:
conventional computed tomography (CT) and spectral CT;
analogue positron emission tomography—computed tomography (PET/CT) and digital PET/CT; and
T1-weighted magnetic resonance imaging (MRI) and T2-FLAIR MRI. For example, the ability of the conventional CT to identify lesions in the neck can be difficult at times due to their location or artifacts from metal and bone. The spectral CT allows the use of multiple spectral results that can help enhance lesion visualization and thus has a higher sensitivity for detecting some lesions than the conventional CT.

For example, digital PET/CT improves detectability and characterization of small lesions relative to the same patient acquired on analogue PET/CT. Therefore, digital PET/CT has a higher sensitivity for detecting some lesions than analogue PET/CT.

For example, the MS lesion shows a high signal in the white matter region in T2-FLAIR MRI, but the lesion only shows mild or no signal change in T1-weighted MRI. It will be understood that the proposed apparatus and method may also be used for other types of medical imaging, as long as it can generate two modalities of images and the lesion behaviour is obvious on one modality while not obvious on the other.

According to an embodiment of the present invention, the apparatus further comprises an output channel configured for outputting the subtraction image and/or a result of lesion identification.

According to an embodiment of the present invention, the apparatus further comprises a display for displaying the subtraction image and/or the result of lesion identification.

According to a second aspect of the present invention, there is provided a computer-implemented method for lesion detection. The computer-implemented method comprises:
  receiving a first input medical image of a region of interest obtained using a first imaging modality and a second input medical image of the region of interest obtained using a second imaging modality, wherein the second imaging modality has a higher sensitivity for detecting a lesion than the first imaging modality;
  applying a pre-trained deep learning neural network to the first input medical image obtained using the first imaging modality to derive a second synthesized medical image, wherein the pre-trained deep learning network has been trained based on a training dataset comprising historical datasets of medical images of the region of interest obtained using the first imaging modality and medical images of the region of interest obtained using the second imaging modality;
  co-registering the second input medical image and the second synthesized medical image; and
  performing a subtraction between the second input medical image and the second synthesized medical image to obtain a subtraction image, which is usable for lesion detection.

According to an embodiment of the present invention, the computer-implemented method further comprises the steps of normalizing the second input medical image and the second synthesized medical image, and performing the subtraction between the normalized second input medical image and the normalized second synthesized medical image.

According to an embodiment of the present invention, the lesion comprises a multiple sclerosis disease lesion.

According to an embodiment of the present invention, the first imaging modality and the second imaging modality comprise at least one of the following:
  conventional computed tomography (CT) and spectral CT;
  analogue positron emission tomography-computed tomography (PET/CT) and digital PET/CT; and
  T1-weighted magnetic resonance imaging (MRI) and T2-FLAIR MRI.

According to an embodiment of the present invention, the computer-implemented method further comprises displaying the subtraction image and/or a result of lesion identification.

According to a third aspect of the present invention, there is provided a computer program element for controlling an apparatus according to the first aspect and any associated example, which, when being executed by a processing unit, is adapted to perform the method according to the second aspect and any associated example.

According to a fourth aspect of the present invention, there is provided a computer readable medium having stored the program element according to the third aspect of the third aspect of the present invention.

Advantageously, the benefits provided by any of the above aspects equally apply to all of the other aspects and vice versa.

As used herein, the term "image" includes image data, composite image data formed with multiple image data, and other types of data that can be acquired by medical imaging device, such as CT scanner, MRI scanner, etc.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logical circuit, and/or other suitable components that provide the described functionality.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

Figure 1:
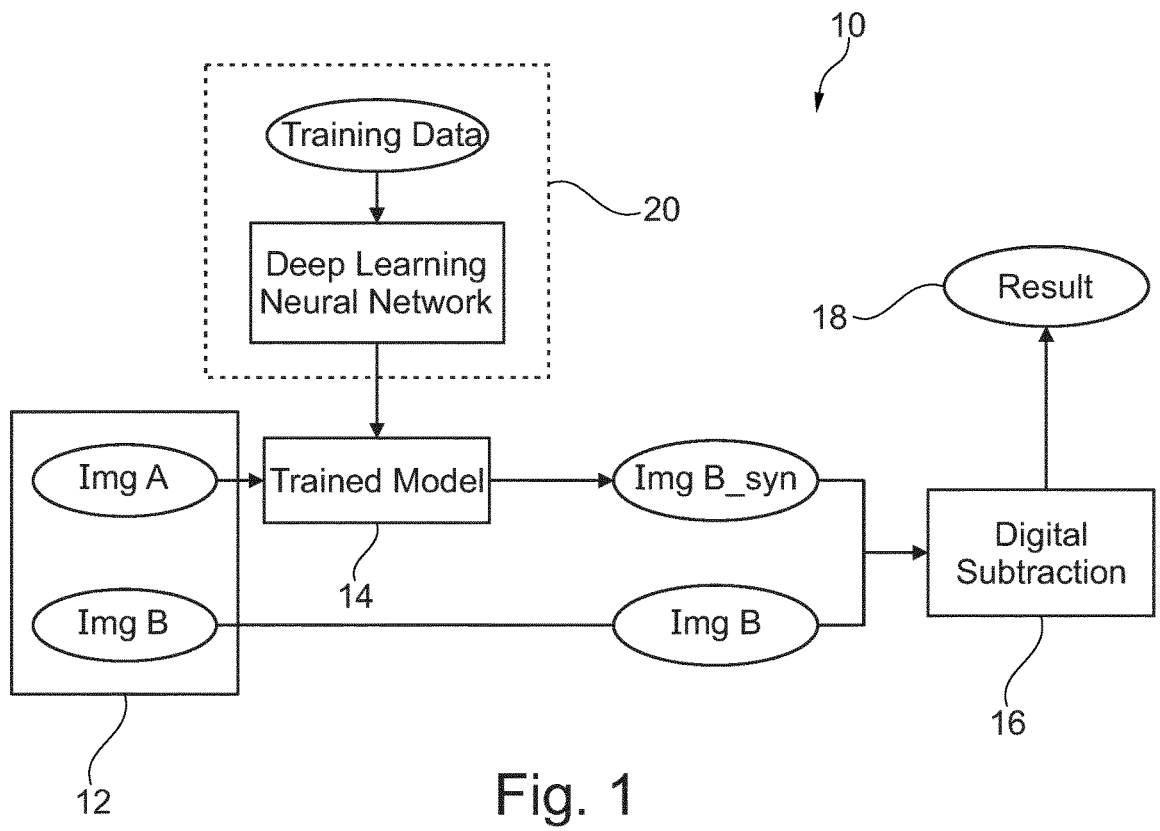
FIG. 1 is a schematic representation of an apparatus, in accordance with some embodiments of the present disclosure.

FIG. 1 schematically shows an apparatus 10 for lesion detection, in accordance with some examples of the present disclosure. The apparatus 10 comprises an input channel 12, a synthesis module 14, a silhouette module 16, and an output channel 18.

The input channel 12 is configured for receiving a first input medical image ImgA of a region of interest obtained using a first imaging modality, also denoted with modality A, and a second input medical image ImgB of the region of interest obtained using a second imaging modality, also denoted with modality B. The second imaging modality, i.e.

modality B, has a higher sensitivity for detecting a lesion than the first imaging modality, i.e. modality A. In an example, the first imaging modality is conventional CT, and the second imaging modality is spectral CT. With spectral data, lesions may be seen that are not identified through conventional CT. In another example, the first imaging modality is analog PET/CT, and the second imaging modality is digital PET/CT. Digital PET/CT may improve detectability and characterization of small lesions relative to the same patient acquired on analog PET/CT. In a further example, the first imaging modality is T1-weighted MRI, and the second imaging modality is T2-FLAIR MRI.

Figures 2A, 2B:
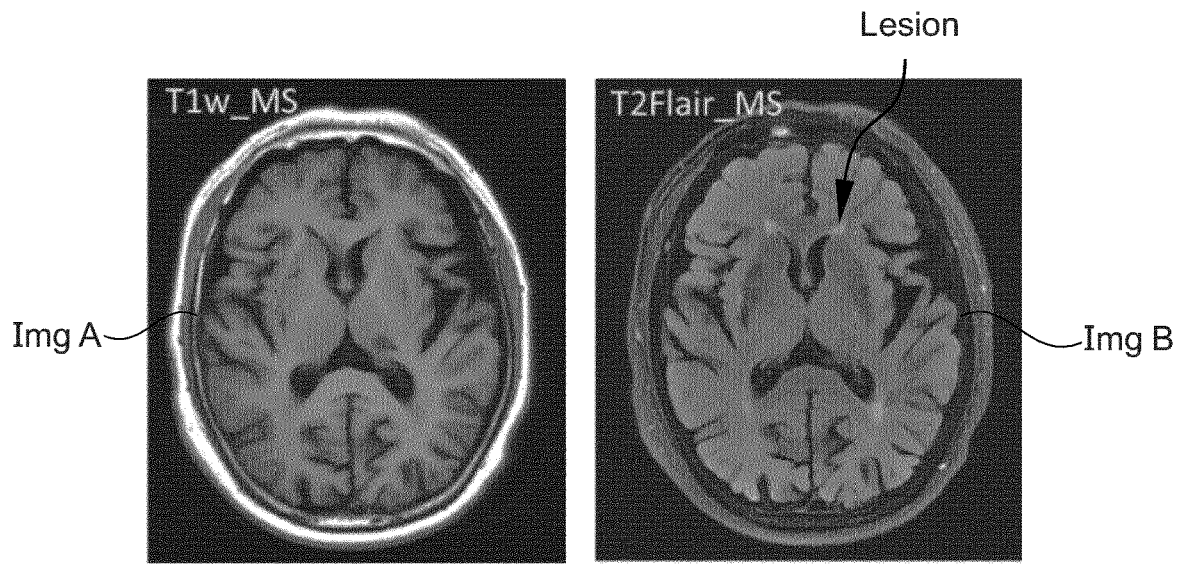
FIGS. 2A and 2B illustrate an example of the first input medical image and the second input medical image, respectively.

FIGS. 2A and 2B illustrate an example of the first input medical image and the second input medical image, respectively. In particular, FIG. 2A illustrates an example of the first input medical image ImgA of a brain of a patient obtained using T1-weighted MRI. FIG. 2B illustrates an example of the second input medical image ImgB of the brain obtained using T2-FLAIR MRI. As illustrated in FIGS. 2A and 2B, the MS lesion shows a high signal in the white matter region in the second input medical image ImgB (i.e. T2-FLAIR MS image), but the lesion only shows mild or no signal change in the first input medical image ImgA (i.e. T1w_MS image) and is thus not obvious.

Turning to FIG. 1, the synthesis module 14 is configured for applying a pre-trained deep learning neural network to the first input medical image ImgA obtained using the first imaging modality (i.e. modality A) to derive a second synthesized medical image ImgB_syn. The pre-trained deep learning neural network has been trained based on a training dataset comprising historical datasets of medical images of the region of interest obtained using the first imaging modality and medical images of the region of interest obtained using the second imaging modality. Examples of the pre-trained deep learning neural network may include, but are not limited to, U-Net and generative adversarial networks.

Optionally, as illustrated in FIG. 1, the apparatus 10 may comprise a training module 20 for training the deep learning neural network. In order to train the deep learning neural network, a training image dataset is collected, which comprises medical images of the region of interest obtained using the first imaging modality and medical images of the region of interest obtained using the second imaging modality. The training image dataset may comprise medical images obtained from a plurality of patients. Medical images in the training image dataset may have no lesions in the region of the interest. This is because the pre-trained deep learning neural network only learns the mapping of modality A to modality B contrast conversion, but does not learn the lesion mapping due to non-obvious lesion appearance in the modality A images.

Figure 3:
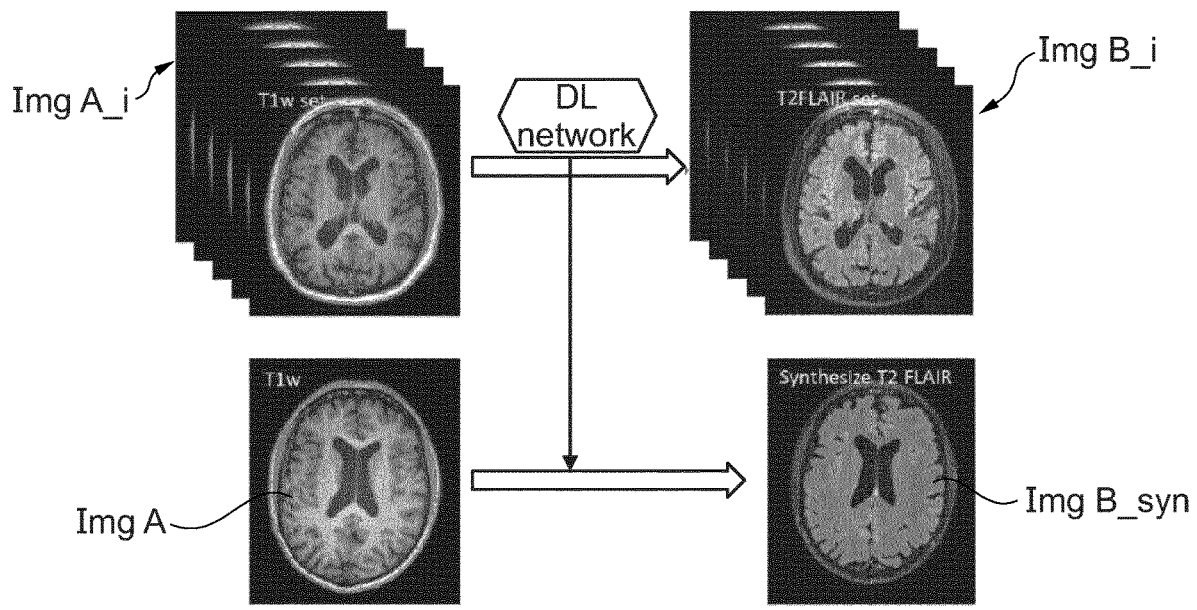
FIG. 3 illustrates an example of the training process.

FIG. 3 illustrates an example of the training process. MRI is again taken as an example to illustrate the training process. In this example, the training image dataset comprises T1-weighted images as ImgA and T2 FLAIR images as ImgB. For subject i in this dataset, there are image of the first imaging modality, i.e. modality A, and image of the second imaging modality, i.e. modality B. For subject i in this dataset, the image of the first imaging modality may also be denoted with ImgA_i, and the image of the second imaging modality may also be denoted with ImgB_i. The training dataset is {ImgA, ImgB} with the number of subjects as N. The deep learning neural network is then established, with ImgA as input and ImgB as target labels to train the deep learning neural network, so that for a new subject k, the ImgA_k can be used to synthesize ImgB_k_syn through the deep learning neural network. The deep learning neural network is then established, with T1-weighted images as input and T2-FLAIR as target labels to train the deep learning neural network.

The trained deep learning neural network is then applied on first input medical image ImgA, such as the T1w_MS image in FIG. 3, to synthesize the second synthesized medical image ImgB_syn, such as T2-FLAIR-MS_synthesized image in FIG. 3, but the lesion is not obvious in this image.

Turning to FIG. 1, the silhouette module 16 is configured for co-registering the second input medical image ImgB (with lesion as hyper signal) and the second synthesized medical image ImgB_syn (with no obvious lesion contrast), and performing a subtraction between the second input medical image ImgB and the second synthesized medical image ImgB_syn to obtain a subtraction image, which is usable for lesion detection.

Figure 4:
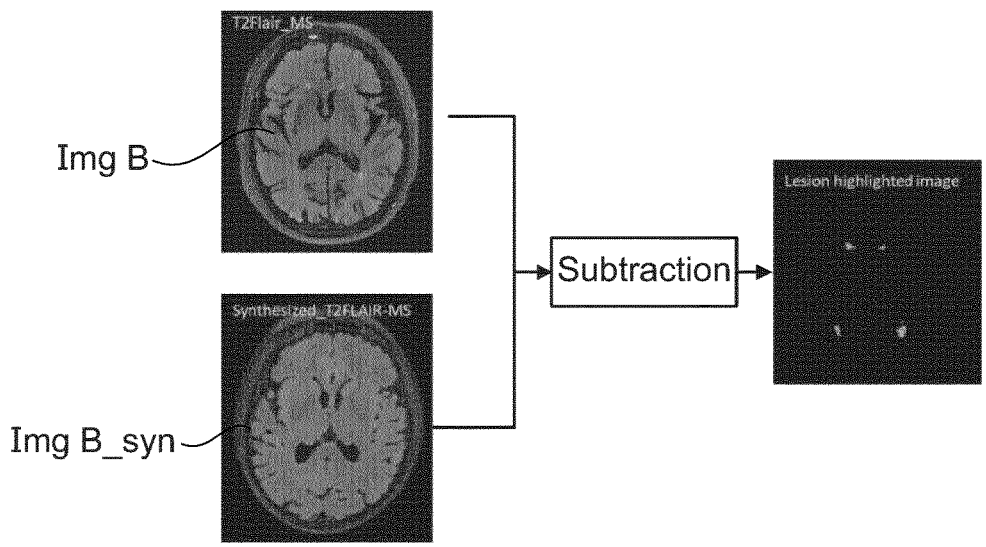
FIG. 4 illustrates an example of the subtraction process.

FIG. 4 illustrates an example of the subtraction process. In this example, the second input medical image ImgB, such as actual T2-FLAIR-MS image in FIG. 4, contains hyper signal contrast at MS lesion regions. On the other hand, the second synthesized medical image ImgB_syn, such as synthesized_T2FLAIR-MS in FIG. 4, only reflects the T2-FLAIR tissue contrast response, but does not reflect the contrast difference at MS lesion regions. This is because the trained deep learning neural network only learned the mapping of T1-weighted to T2-FLAIR contrast conversion, but not learned the lesion mapping due to non-obvious appearance in T1-weighted images.

The silhouette module then co-registers these two images and takes the subtraction. Consequently, the MS lesion regions are highlighted in the subtraction image, while normal tissue regions are cancelled out. The subtraction image is simple and clearer for diagnosis.

Optionally, the silhouette module 16 may be configured for normalizing the second input medical image and the second synthesized medical image, and performing a subtraction between the normalized second input medical image and the normalized second synthesized medical image.

Optionally, the apparatus 10 may further comprise a lesion identification module (not shown) configured for identifying the lesion in the subtraction image. For example, the lesion identification module may use machine learning based approaches for lesion detection. As the subtraction image allows to visualize the lesion boundaries, differentiating it from the surrounding tissue. The lesion identification may be more accurate, thus enabling a path to improved diagnosis, staging and treatment monitoring.

Turning to FIG. 1, the output channel 18 is configured for outputting the subtraction image and/or a result of lesion identification. The apparatus 10 may further comprise a display (not shown) for displaying the subtraction image and/or the result of lesion identification.

Figure 5:
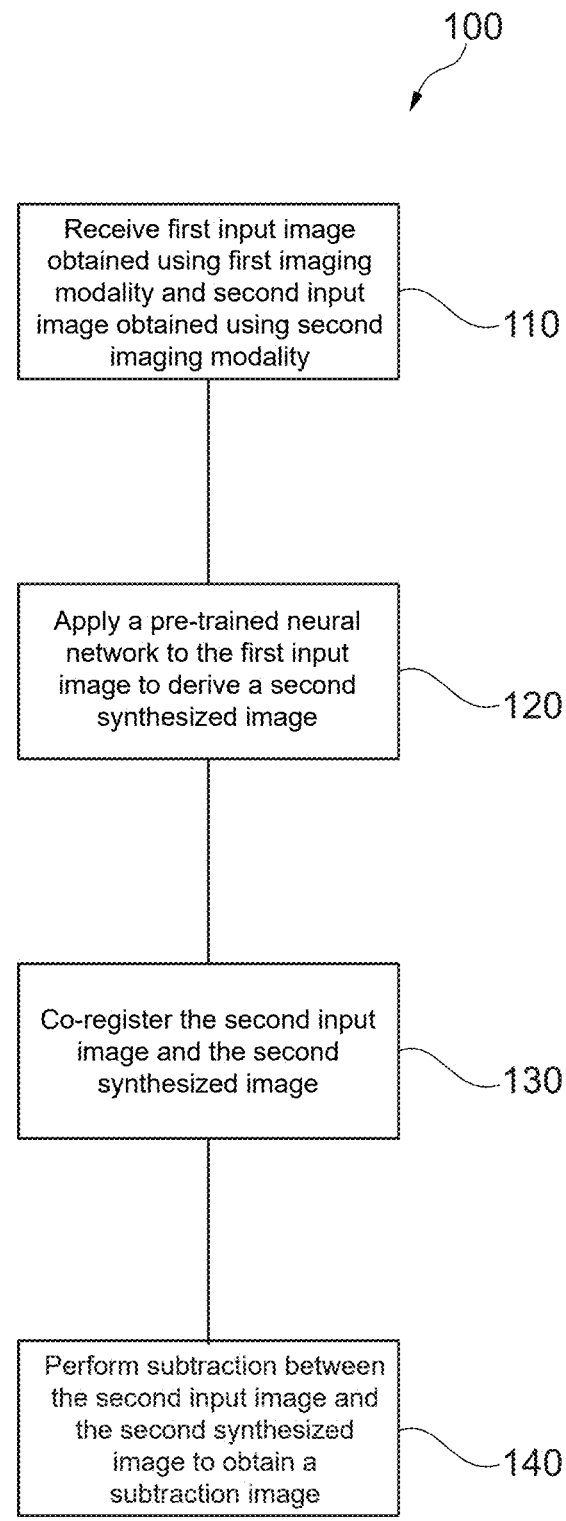
FIG. 5 shows a flowchart of a method, in accordance with some embodiments of the present disclosure.

FIG. 5 shows a flow chart of a computer-implemented method 100 for lesion detection according to some embodiments of the present disclosure.

The computer-implemented method 100 may be implemented as a device, module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. An exemplary apparatus for performing the method is illustrated in FIG. 1. For example, computer program code to carry out operations shown in the method 100 may be written in any combination of one or more programming languages, including an object oriented programming language such as JAVA, SMALLTALK, C++, Python, or the like and conventional procedural programming languages, such as the "C" programming language or similar programming languages.

In step 110, a first input medical image of a region of interest obtained using a first imaging modality and a second input medical image of the region of interest obtained using a second imaging modality are received. The second imaging modality has a higher sensitivity for detecting a lesion than the first imaging modality. For example, the first imaging modality is conventional CT, while the second imaging modality is spectral CT. For example, the first imaging modality is analogue PET/CT, while the second imaging modality is digital PET/CT. For example, the first imaging modality is T1-weighted MRI, while the second imaging modality is T2-FLAIR MRI.

An exemplary first input medical image is illustrated in FIG. 2A, while an exemplary second input medical image is illustrated in FIG. 2B.

In step 120, a pre-trained deep learning neural network is applied to the first input medical image obtained using the first imaging modality to derive a second synthesized medical image. Examples of the pre-trained deep learning neural network may include, but are not limited to, U-NET and generative adversarial networks.

The pre-trained deep learning network has been trained based on a training dataset comprising historical datasets of medical images of the region of interest obtained using the first imaging modality and medical images of the region of interest obtained using the second imaging modality. The medical images of the region of interest obtained using the first imaging modality and the medical images of the region of interest obtained using the second imaging modality in the training dataset may comprise no lesions in the region of interest.

An exemplary training process is illustrated in FIG. 3.

In step 130, the second input medical image and the second synthesized medical image are co-registered.

In step 140, a subtraction between the second input medical image and the second synthesized medical image is performed to obtain a subtraction image, which is usable for lesion detection. Optionally, the computer-implemented method 100 may further comprise steps of normalizing the second input medical image and the second synthesized medical image, and performing the subtraction between the normalized second input medical image and the normalized second synthesized medical image.

An exemplary subtraction process is illustrated in FIG. 4.

Optionally, the computer-implemented method 100 may further comprise the step of identifying the lesion in the subtraction image.

Optionally, the subtraction image and/or a result of lesion identification is displayed.

It will be appreciated that the above operation may be performed in any suitable order, e.g., consecutively, simultaneously, or a combination thereof, subject to, where applicable, a particular order being necessitated, e.g., by input/output relations.

The apparatus and method described above may be used not only for MS disease lesion detection improvement, but also may be generalized to brain lesion detection, especially for the situation that the lesion does not appear typical change of contrast in MR images.

This method may also be generalized to other type of medical imaging, as long as it can generate two modalities of images and the lesion behaviour is obvious on one modality while not obvious on the other.

It should also be understood that, unless clearly indicated to the contrary, in any methods claimed herein that include more than one step or act, the order of the steps or acts of the method is not necessarily limited to the order in which the steps or acts of the method are recited.

All definitions, as defined and used herein, should be understood to control over dictionary definitions, definitions in documents incorporated by reference, and/or ordinary meanings of the defined terms.

The indefinite articles "a" and "an" as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. An apparatus for lesion detection, the apparatus comprising:
an input channel configured to obtain a first input medical image of a region of interest obtained using a first imaging modality and a second input medical image of the region of interest obtained using a second imaging modality, wherein the second imaging modality has a higher sensitivity for detecting a lesion than the first imaging modality; and
a processor configured to:
apply a pre-trained deep learning neural network to the first input medical image obtained using the first imaging modality to derive a second synthesized medical image of the second imaging modality, wherein the pre-trained deep learning network has been trained based on a training dataset comprising historical datasets of medical images of the region of interest obtained using the first imaging modality and medical images of the region of interest obtained using the second imaging modality,
co-register the second input medical image and the second synthesized medical image, and
perform a subtraction between the second input medical image and the second synthesized medical image to obtain a subtraction image, which is usable for lesion detection.

2. The apparatus according to claim 1, wherein the processor is further configured to:
normalize the second input medical image and the second synthesized medical image, and
perform a subtraction between the normalized second input medical image and the normalized second synthesized medical image.

3. The apparatus according to claim 1, wherein the processor is further configured to:
identify the lesion in the subtraction image.

4. The apparatus according to claim 1, wherein the pre-trained deep learning neural network comprises at least one of:
U-Net; and
generative adversarial networks.

5. The apparatus according to claim 1, wherein the first imaging modality and the second imaging modality comprise at least one of:
conventional computed tomography (CT) and spectral CT;
analogue positron emission tomography-computed tomography (PET/CT) and digital PET/CT; and
T1-weighted magnetic resonance imaging (MRI) and T2-FLAIR MRI.

6. The apparatus according to claim 1, wherein the lesion comprises a multiple sclerosis disease lesion.

7. The apparatus according to claim 1, further comprising:
an output channel configured to output at least one of: the subtraction image and a result of lesion identification.

8. The apparatus according to claim 7, further comprising:
a display configured to display at least one of the subtraction image and the result of lesion identification.

9. A computer-implemented method for lesion detection, the method comprising:

obtaining a first input medical image of a region of interest obtained using a first imaging modality and a second input medical image of the region of interest obtained using a second imaging modality, wherein the second imaging modality has a higher sensitivity for detecting a lesion than the first imaging modality;

applying a pre-trained deep learning neural network to the first input medical image obtained using the first imaging modality to derive a second synthesized medical image of the second imaging modality, wherein the pre-trained deep learning network has been trained based on a training dataset comprising historical datasets of medical images of the region of interest obtained using the first imaging modality and medical images of the region of interest obtained using the second imaging modality;

co-registering the second input medical image and the second synthesized medical image; and performing a subtraction between the second input medical image and the second synthesized medical image to obtain a subtraction image, which is usable for lesion detection.

10. The method according to claim 9, further comprising:
normalizing the second input medical image and the second synthesized medical image; and
performing the subtraction between the normalized second input medical image and the normalized second synthesized medical image.

11. The method according to claim 9,
wherein the first imaging modality and the second imaging modality comprise at least one of:
conventional computed tomography (CT) and spectral CT;
analogue positron emission tomography-computed tomography (PET/CT) and digital PET/CT; and
T1-weighted magnetic resonance imaging (MRI) and T2-FLAIR MRI.

12. The method according to claim 9, wherein the lesion comprises a multiple sclerosis disease lesion.

13. The method according to claim 9, further comprising:
displaying at least one of the subtraction image and a result of lesion identification.

14. A non-transitory computer-readable storage medium having stored a computer program comprising instructions, which, when executed by a processor, cause the processor to:
obtain a first input medical image of a region of interest obtained using a first imaging modality and a second input medical image of the region of interest obtained using a second imaging modality, wherein the second imaging modality has a higher sensitivity for detecting a lesion than the first imaging modality;
apply a pre-trained deep learning neural network to the first input medical image obtained using the first imaging modality to derive a second synthesized medical image of the second imaging modality, wherein the pre-trained deep learning network has been trained based on a training dataset comprising historical datasets of medical images of the region of interest obtained using the first imaging modality and medical images of the region of interest obtained using the second imaging modality;
co-register the second input medical image and the second synthesized medical image; and
perform a subtraction between the second input medical image and the second synthesized medical image to obtain a subtraction image, which is usable for lesion detection.

15. The non-transitory computer-readable storage medium according to claim 14, wherein the instruction, when executed by the processor, further cause the processor to:
normalize the second input medical image and the second synthesized medical image, and
perform a subtraction between the normalized second input medical image and the normalized second synthesized medical image.

16. The non-transitory computer-readable storage medium according to claim 14, wherein the instruction, when executed by the processor, further cause the processor to:
identify the lesion in the subtraction image.

17. The non-transitory computer-readable storage medium according to claim 14, wherein the first imaging modality and the second imaging modality comprise at least one of:
conventional computed tomography (CT) and spectral CT;
analogue positron emission tomography-computed tomography (PET/CT) and digital PET/CT; and
T1-weighted magnetic resonance imaging (MRI) and T2-FLAIR MRI.

18. The non-transitory computer-readable storage medium according to claim 14, wherein the pre-trained deep learning neural network comprises at least one of:
U-Net; and
generative adversarial networks.

19. The non-transitory computer-readable storage medium according to claim 14,
wherein the lesion comprises a multiple sclerosis disease lesion.

20. The non-transitory computer-readable storage medium according to claim 14, wherein the instruction, when executed by the processor, further cause the processor to:
output at least one of: the subtraction image and a result of lesion identification.

* * * * *